(12) United States Patent
Elie

(10) Patent No.: US 12,566,066 B2
(45) Date of Patent: Mar. 3, 2026

(54) HYBRID INERTIAL/STELLAR NAVIGATION METHOD WITH HARMONIZATION PERFORMANCE INDICATOR

(71) Applicant: SAFRAN ELECTRONICS & DEFENSE, Paris (FR)

(72) Inventor: Philippe Elie, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 135 days.

(21) Appl. No.: 18/708,081

(22) PCT Filed: Nov. 9, 2022

(86) PCT No.: PCT/EP2022/081312
§ 371 (c)(1),
(2) Date: May 7, 2024

(87) PCT Pub. No.: WO2023/083879
PCT Pub. Date: May 19, 2023

(65) Prior Publication Data
US 2025/0085110 A1 Mar. 13, 2025

(30) Foreign Application Priority Data
Nov. 9, 2021 (FR) ...................................... 2111864

(51) Int. Cl.
*G01C 21/16* (2006.01)
*G01C 21/02* (2006.01)

(52) U.S. Cl.
CPC ......... *G01C 21/188* (2020.08); *G01C 21/025* (2013.01); *G01C 21/1656* (2020.08)

(58) Field of Classification Search
CPC .... G01C 21/005; G01C 21/20; G01C 21/025; G01C 21/188; G01C 21/28; G01C 25/005; G06T 7/248; G08G 5/55
See application file for complete search history.

(56) References Cited

U.S. PATENT DOCUMENTS

2011/0137560 A1* 6/2011 May ..................... G01C 21/188
701/500
2017/0358208 A1* 12/2017 Kazemi .................. G08G 1/144
(Continued)

FOREIGN PATENT DOCUMENTS

EP 3599444 A1 1/2020

OTHER PUBLICATIONS

Ni Yuanman et al. "A stellar/inertial integrated navigation method based on the observation of the star centroid prediction error", Review of Scientifice Instruments, American Instititute of Phsics, 2 Huntington Quadrangle, Melville, NY 11747, vol. 92, No. 3, Mar. 4, 2021, DOI: 10.1063/5.027530, ISSN: 0034-6748, XP012254420, 11 pages.

*Primary Examiner* — Hunter B Lonsberry
*Assistant Examiner* — Henry R Hinton
(74) *Attorney, Agent, or Firm* — MUNCY, GEISSLER, OLDS & LOWE, P.C.

(57) ABSTRACT

A navigation method of a vehicle equipped with a star tracking device, a first inertial measurement device and a satellite positioning device, the star tracking device and the first inertial measurement device being connected to a single support. The method includes controlling movements of the support; simultaneously with these movements, calculating, in a horizontal plane, first positions of the vehicle, and second positions of the vehicle; calculating first deviations between the first positions and the second positions corresponding to each tracking heading and depicting them in a polar reference frame as a function of the corresponding heading and the values of the first deviations; carrying out a circular regression on said first deviations to determine, in this polar reference frame, a first circle; and determining a radius of the circle and a second deviation between a centre of the first circle and an origin of the polar reference frame.

11 Claims, 4 Drawing Sheets

(56)      References Cited

U.S. PATENT DOCUMENTS

2020/0025571 A1* 1/2020 Skilton ................ G01C 21/025
2021/0247188 A1   8/2021 Ollagnier et al.

* cited by examiner

HYBRID INERTIAL/STELLAR NAVIGATION METHOD WITH HARMONIZATION PERFORMANCE INDICATOR

The present invention relates to the field of vehicle navigation, i.e. locating vehicles along their trajectory from a starting point to an arrival point. The invention relates more specifically to stellar navigation.

BACKGROUND OF THE INVENTION

Navigation systems comprising an inertial navigation device associated with a star tracking device are known.

The inertial navigation device comprises an inertial measurement unit which is fixed to the carrier vehicle and which comprises linear inertial sensors (accelerometers) and angular inertial sensors (generally gyroscopes) disposed along the axes of a measurement reference frame to provide signals, or increments, representative of the integral, over successive time steps, of the specific force vector with respect to a reference inertial reference frame ("specific force", "g-force" or "mass-specific force"—is a representation of the sum, on the one hand, of the acceleration of the carrier vehicle of the inertial measurement unit with respect to the inertial reference frame and, on the other hand, of the Earth's gravity). The sensors are connected to a first electronic processing circuit programmed to utilise the signals provided by the inertial measurement unit so as to determine an inertial attitude of the horizontal plane of the star tracking device.

The star tracking device comprises at least one image sensor, or star tracker, fixed to the carrier vehicle and connected to a second electronic processing circuit programmed to recognise celestial bodies in the images provided by the image sensor and deduce from these, a stellar position of the carrier vehicle. To do this, the second electronic processing circuit, knowing the position of the carrier vehicle obtained moreover, utilises the inertial attitude, in order to:

- determine the local vertical to the star tracking device to deduce from this, the pointing direction of the image sensor and the sky portion entering into the field of the image sensor;
- identify the celestial bodies present in the field in question by means of an ephemeride;
- determine in a measurement reference frame of the star tracking device, the ascension and the declination of celestial bodies and deduce from this, by triangulation, the stellar position of the carrier vehicle.

The performance of such navigation systems depends mainly on the harmonisation of the measurement reference frame of the star tracking device with that of the inertial measurement unit. It results from this, that the installation is complex, as the precision of the relative mounting of the star tracking device and of the inertial measurement unit in position and in attitude must be ensured. If the attitude error can be defined during a maintenance operation, there is no instrument to know the attitude error of the moving inertial measurement unit. However, there is a method for estimating harmonisation and attitude errors, based on a modelling of the errors of the inertial measurement unit. This modelling makes it possible to extract the error committed on an inertial direction and to connect it to the position and attitude error of the inertial measurement unit. This modelling can be implemented via a linear regression, implemented by a Kalman filtering or a least-square for example, to estimate the constant attitude and harmonisation errors. This however does not make it possible to ensure that the harmonisation of the tracking device with the inertial measurement unit is efficient.

There are, moreover, satellite positioning devices or satellite navigation systems (so-called GNSS system—"Global Navigation Satellite System") comprising a satellite signal positioning receiver, embedded on the carrier vehicle, which provides a so-called GNSS position of said vehicle. The satellite signals are sent by satellites of a constellation of satellites (like those of GPS, GALILEO, GLONASS, BEIDOU systems, etc.), and make it possible to calculate a pseudo-distance between the receiver and each satellite on the basis of the duration between the moment of emitting the signal by each satellite and the moment of receiving said signal by the receiver. With the position of each satellite being known, thanks to a ephemeride, the position of the receiver can be calculated by trilateration. The satellite position thus calculated is very precise.

It is known to perform hybrid inertial/GNSS navigations providing, by means of a Kalman filtering, a hybrid position maintained by the inertial location and periodically reset by means of the satellite position.

Aim of the Invention

The invention in particular aims to provide a means of monitoring at least some of the errors impacting the performance of a star tracking device.

SUMMARY OF THE INVENTION

To this end, a navigation method of a vehicle equipped with a star tracking device is provided according to the invention, of a first inertial measurement device and a satellite positioning device, the star tracking device and the first inertial measurement device being rigidly connected to a single support. The method comprises the steps of:

- controlling movements of the support according to different tracking headings of the star tracking device,
- simultaneously with these movements, calculating in a horizontal plane, first positions of the vehicle on the basis of a first navigation algorithm using stellar measurements and second positions of the vehicle on the basis of a second navigation algorithm using, according to a coupling, first inertial measurements coming from the first inertial measurement device and satellite measurements,
- calculating first deviations between the first positions and the second positions corresponding to each tracking heading and depicting them in a polar reference frame according to the corresponding heading and values of said first deviations,
- carrying out a circular regression on said first deviations to determine, in this polar reference frame, a first circle representative of all of the first deviations,
- determining a radius s of the circle and a second deviation between a centre of the first circle and an origin of the reference frame.

The position deviations are in particular due to the attitude error of the horizontal plane defined by the inertial measurement device and to the harmonisation error between the inertial measurement device and the star tracking device. While a depiction of these deviations in a Cartesian latitude/longitude reference frame would not make it possible to distinguish the contribution of these two defects to the deviations, a depiction in a polar reference frame as a function of the heading, as proposed in the invention, makes it possible to separate them, one of the errors being modulated by the heading rotation, while the other is not. Once the first circle defined by circular regression, the radius of the circle is representative of the harmonisation error between the inertial measurement device and the star tracking device, while the second deviation, between the centre of the circle and the origin of the reference frame, is representative of the attitude error of the horizontal plane of the inertial measurement device. Therefore, a simple modelling is disposed, making it possible to calculate these errors and to monitor them.

Preferably, the method comprises the steps of:

returning all the first deviations to a single heading to obtain third deviations, carrying out a linear regression on the third deviations to obtain a straight line representative of all of the third deviations, deducing from this, an attitude error of the horizontal plane and a harmonisation error between the star tracking device and the inertial measurement device, defining in the polar reference frame, a second circle having a radius equal to the harmonisation error and a centre separated from an origin of the reference frame according to a vector corresponding to the attitude error of the horizontal plane as a function of the heading, verifying a coherence between the first circle and the second circle.

The coherence of the two circles makes it possible to monitor the precision of the estimation of the harmonisation and attitude errors of the horizontal plane obtained by the circular regression.

The invention also relates to a navigation system implementing this method and a vehicle provided with such a navigation system.

Other features and advantages of the invention will emerge upon reading the description below of a particular and non-limiting embodiment of the invention.

BRIEF DESCRIPTION OF THE DRAWINGS

Reference will be made to the accompanying drawings, among which.

DETAILED DESCRIPTION OF THE INVENTION

Figures 1, 2:
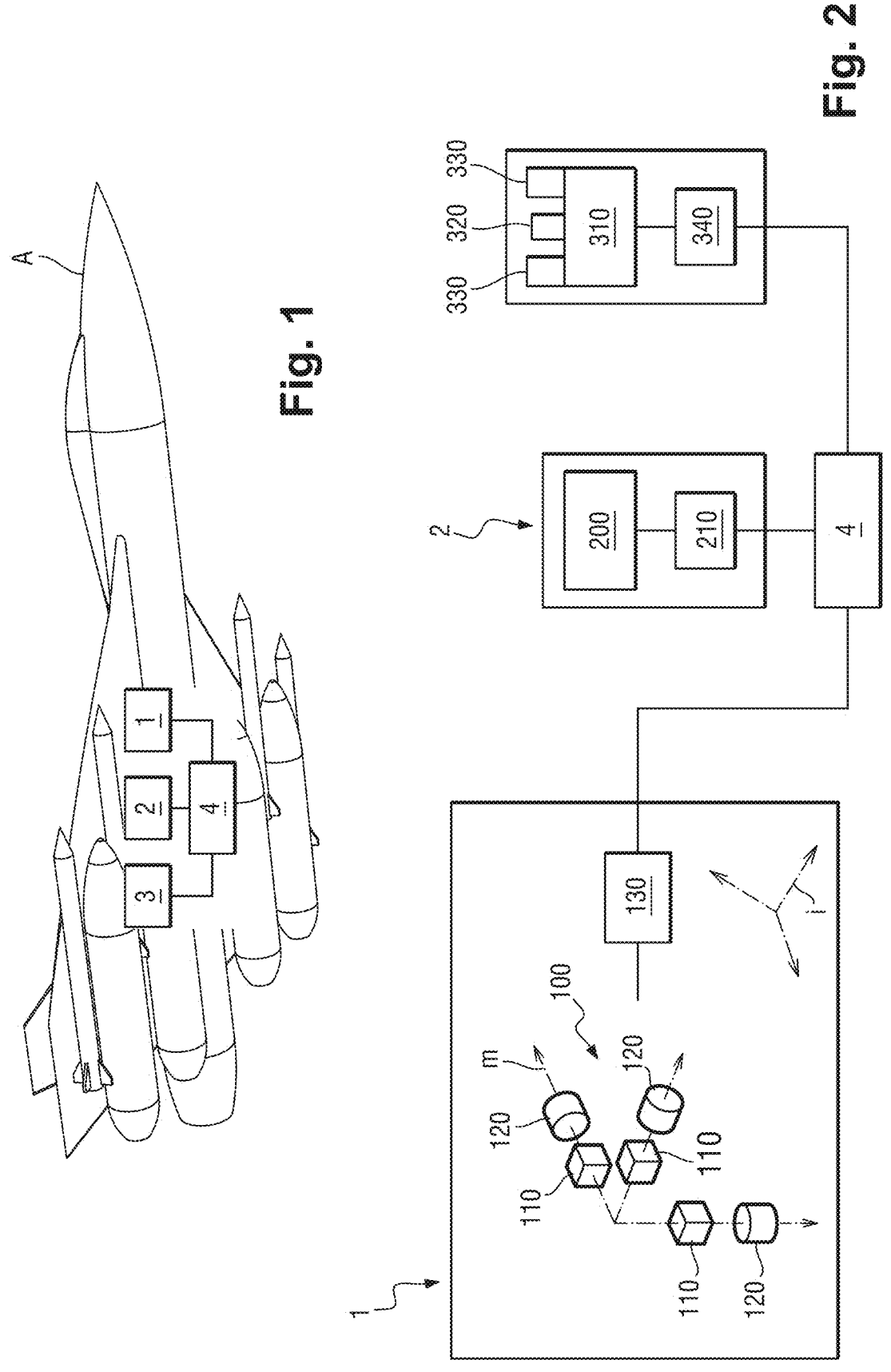
FIG. 1 is a schematic view of an aircraft equipped with a navigation system according to the invention.
FIG. 2 is a schematic view of the navigation system according to the invention.

In reference to FIGS. 1 and 2, the invention is, in this case, described in an aeronautical application, the navigation system of the invention being embedded in an aeroplane A known in itself. The navigation system according to the invention comprises an inertial navigation device generally referenced as 1, a satellite navigation device generally referenced as 2, a stellar navigation device generally referenced as 3, and an electronic navigation calculation unit generally referenced as 4.

The inertial navigation device 1, known in itself, comprises an inertial measurement unit 100 fixed to the structure of the aeroplane A via suspension means according to a conventional, so-called "strap-down" mounting. The inertial measurement unit 100 comprises inertial sensors, namely linear sensors inertial (more specifically, accelerometers 110) disposed along the axes of a measurement reference frame m to measure the "gravitational speed" of this reference frame (i.e. the time integral of the specific force present at the centre of this reference frame) and angular inertial sensors, in this case, gyroscopes 120, disposed along the axes of this reference frame to measure the rotation of the measurement reference frame m with respect to an inertial reference frame i. The inertial sensors do not provide absolute values, but increments representative of a variation of the magnitude measured with respect to the preceding measurement. The inertial reference frame i is, for example, the reference frame for measuring the voltage of the inertial measurement unit 100 or any other inertial reference frame angularly offset with respect to the latter. The increments of the integral of the specific force are thus representative of a variations of the components of the gravitational speed along the three axes of the reference frame m. The rotation increments are thus representative of the variation of the integral over time of the angular rotation speed of the measurement reference frame m with respect to the inertial reference frame i and are provided in the form of quaternions, Euler angles, rotation matrices, or Bortz vectors. The inertial sensors thus provide primary signals containing first data representative of a gravitational speed variation (accelerometric measurement) and second data representative of an angle variation (gyroscopic measurement). The inertial measurement unit 100 is connected to an electronic processing unit 130 which utilises these signals to calculate by means of an inertial navigation algorithm, inertial location data comprising attitude (sway, pitch, yaw), speed and position data. This calculation is conventional and is not detailed further, in this case.

In a manner known in itself, the satellite navigation device 2 comprises:

on the one hand, a receiver 200 of positioning satellite signals emitted by satellites of a satellite constellation of a GNSS system, such as GPS, GALILEO, GLONASS, BEIDOU systems, etc.

on the other hand, an electronic processing unit 210 connected to the receiver 200.

The electronic processing unit 210 is arranged conventionally to calculate:

a pseudo-distance between the receiver 200 and each satellite on the basis of the duration between the moment of emitting the signal by each satellite and the moment for receiving said signal by the receiver 200;

the position of the receiver by trilateration on the basis of pseudo-distances and of the position of each satellite known thanks to an ephemeride. The position of the receiver is called "satellite position" below.

This calculation is conventional and is not detailed further, in this case.

Figure 3:
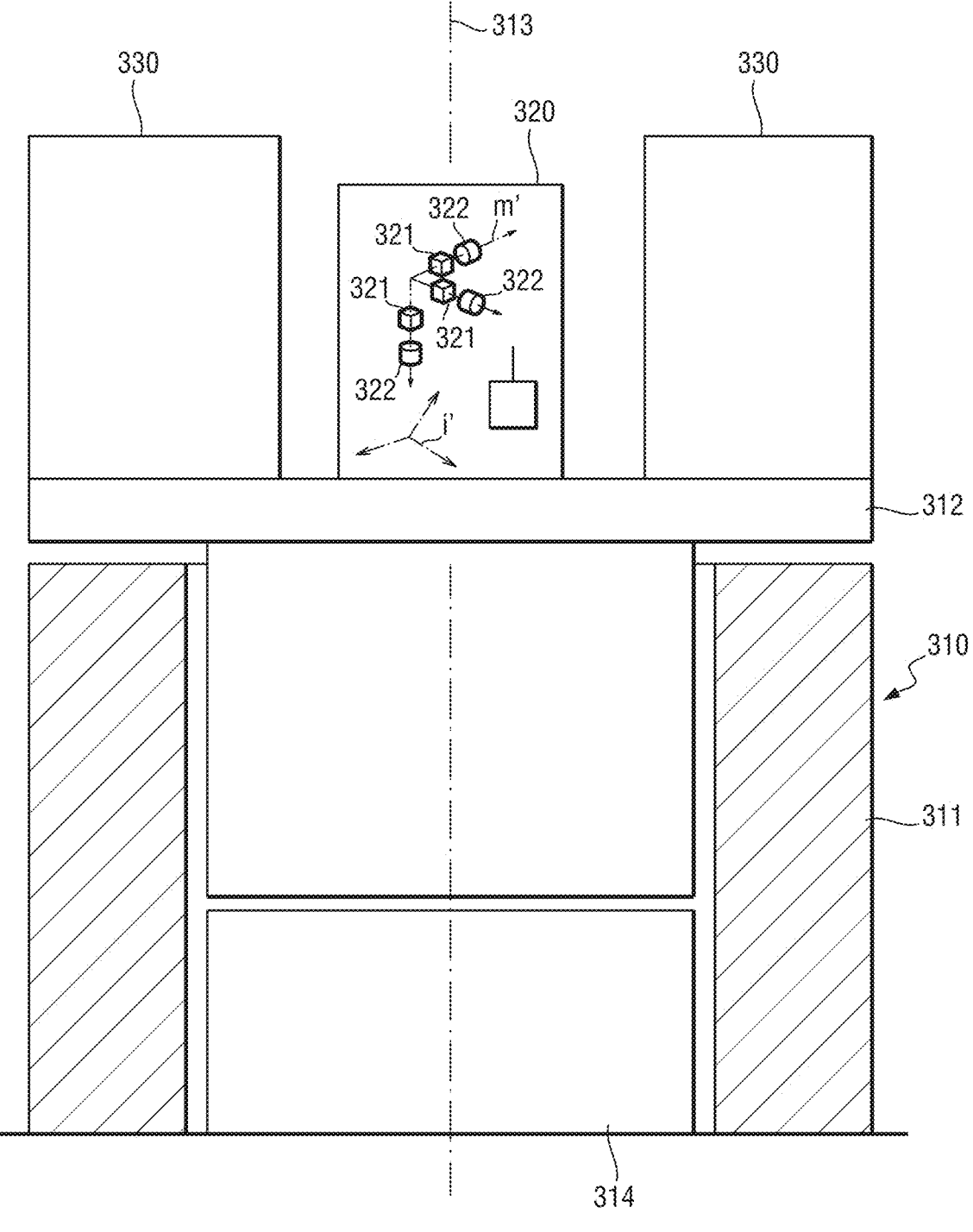
FIG. 3 is a schematic view of the star tracking device.

In reference to FIG. 3, the stellar navigation device 3 comprises a rotary table 310 on which an inertial measurement unit 320 and two star trackers 330 are fixed.

The rotary table 310 comprises a frame 311, a plate 312, forming a support, mounted to pivot on the frame 311 about an axis of rotation 313, and a motor 314 arranged to rotate the plate 312 with respect to the frame 311. The means for rotatably guiding the plate 312 with respect to the frame 311 are not depicted, but are bearings (ball bearings, roller bearings, needle bearings) and optionally axial abutments (for example, needle abutments) known in themselves. The frame 311 is mounted on the structure of the aeroplane A such that the axis of rotation 313 is parallel to a vertical axis of the aeroplane A when the sway and the pitch of it are zero.

The inertial measurement unit 320 is fixed to the plate 312 according to a conventional so-called "strap-down" mounting and comprises, like the inertial measurement unit 100, inertial sensors, namely linear inertial sensors (accelerometers 321) disposed along the axes of a measurement reference frame m' to measure the "gravitational speed" of this reference frame and of the angular inertial sensors (gyroscopes 322), disposed along the axes of this reference frame to measure the rotation of the measurement reference frame m' with respect to an inertial reference frame i'. It is understood that the inertial measurement unit 320 makes it possible to determine a local horizontal plane and the local vertical of the rotary table 310 and therefore of the tracking device 300. With the inertial measurement unit 320 being mounted on the plate 312, the precision of the guiding of the rotation of the plate 312 with respect to the frame 311 has no impact on the precision of the measurements provided by the star tracking device 300 (if the inertial measurement unit was fixed to the frame 311, the precision of the rotatable guiding would, on the contrary, have a significant impact on the precision of the measurements, since the local vertical determined by the inertial measurement unit would be that of the frame 311 and would be similar to that of the table 312 close to the guiding tolerances).

The star trackers 330 are disposed, for example, at 180° from one another to limit the size (three of these could also be ideally disposed at) 120° and each comprise an image sensor and an associated optic. The image sensors and the optics are known in themselves and are arranged (sensitivity, field, focal, definition, resolution, etc.) to capture images of the sky making it possible to detect celestial bodies there.

The inertial measurement unit 320 and the trackers 330 are connected to an electronic processing unit 340, which:

utilises the signals provided by the inertial measurement unit 320 to calculate, by means of an inertial navigation algorithm, inertial location data comprising attitude (sway, pitch, yaw), speed and position data (with this calculation being conventional, it is not detailed further, in this case);

accurately determines, on the basis of these attitude data, the local vertical to the star tracking device 2 (and therefore the attitude of the horizontal plane) and therefore the pointing direction of each tracker 330, roughly determines, on the basis of the position of the vehicle and of the pointing direction of each tracker 330, the portion of sky which can be seen by each of the trackers 330;

on the basis of an ephemeride, identifies celestial bodies which can be seen in the images captured by the trackers 330 for the position in question;

determines in a measurement reference frame of the star tracking device 3, the ascension and the declination of the celestial bodies and deduces from this, by triangulation, the stellar position of the aeroplane A.

This calculation is conventional, and is not detailed further, in this case. However, it will be noted that the more the celestial bodies chosen for the triangulation will be moved away from one another, the more precise the stellar position will be.

The electronic processing units 130, 210, 340 are, in this case, substantially the same structure and comprise a processor and a memory containing a program arranged to utilise the data as explained above, when it is executed by the processor. The electronic processing units 130, 210, 340 are connected to the electronic navigation calculation unit 4 to transmit to it, signals containing respectively the inertial location, the satellite position and the stellar position. The electronic navigation calculation unit 4 is further connected to the motor 314.

The electronic navigation calculation unit 4 is known in itself and comprises a casing containing at least one processor and one memory containing a computer program which is executable by the processor and which comprises instructions arranged to implement the method of the invention.

Generally, the method of the invention is, in this case, arranged to make it possible, on the one hand, to calculate a navigation on the basis of signals provided by the electronic processing units 130, 210, 340 and, on the other hand, to monitor the harmonisation error of the star tracking device with the inertial measurement unit 320 and the attitude error of the horizontal plane defined by the inertial measurement unit 320 by utilising the satellite signals.

Relating to the navigation, the method comprises the steps of:

utilising the signals provided by the electronic processing units 130, 210 with a close continuous coupling (but the invention also operates with a loose coupling) to calculate a hybrid inertial/satellite position by means of main a hybrid operational navigation algorithm, utilising the signals provided by the electronic processing unit 340 to periodically reset the hybrid inertial/satellite position, in case of unavailability of satellite signals, utilising the signals provided by the electronic processing units 130, 340 with a close coupling to calculate a hybrid inertial/stellar position by means of the main hybrid operational navigation algorithm.

The hybrid positions are used to control the aeroplane A in view of bringing it from its starting point to its arrival point.

Relating to the monitoring, the method comprises the steps of:

controlling the motor 314 to cause movements of the plate 312 according to different headings of the star tracker 330, simultaneously with these movements, calculating in the horizontal plane, first positions of the aeroplane A on the basis of a first additional navigation algorithm using stellar measurements and second positions of the aeroplane A on the basis of a second additional navigation algorithm using, according to a close (or loose as indicated above) continuous coupling of the first inertial measurements coming from the inertial measurement device 320 and of the satellite measurements, calculating first deviations between the first positions and the second positions corresponding to each heading and depicting them in a polar reference frame P as a function of the corresponding heading and of the values of the first deviations (in this case, it is chosen to place the averages of the values of the first deviations per heading), carrying out a circular regression on said first deviations to determine, in this polar reference frame, a first circle C1 representative of all of the first deviations, determining a radius r1 of the circle C1 and a second deviation between a centre c1 of the first circle C1 and an origin o of the polar reference frame P.

The radius r1 of the circle C1 is equal to a first estimation of the harmonisation error between the inertial measurement device 320 and the star trackers 330 of the star tracking device 3, while the second deviation between the centre c1 of the circle C1 and the origin o of the polar reference frame P is equal to a first estimation of the attitude error of the inertial measurement device 320.

The method further comprises the steps of:

returning all the first deviations to a single heading, in this case 0°, to obtain third deviations (this is carried out by rotating the first deviations calculated for each heading to return them to) 0°, carrying out a linear regression on the third deviations to obtain a straight line representative of all of the third deviations, by deducing from it, in a manner known in itself, a second estimation of the attitude error of the horizontal plane and a second estimation of the harmonisation error between the star trackers 330 of the star tracking device 3 and the inertial measurement device 320, defining in the polar reference frame P, a second circle C2 having a radius r2 equal to the second estimation of the harmonisation error and a centre c2 separated from the origin o of the polar reference frame P according to a vector corresponding to the second estimation of the attitude error of the horizontal plane as a function of the heading, verifying a coherence between the first circle C1 and the second circle C2.

The deviation of the position of the star tracking device with the reference position returned in the local geographic reference frame [g] is expressed according to the following law:

$$Y_g = \varphi + \hat{T}_{gb} \cdot T_{ba} \cdot \hat{T}_{ak} \cdot Harmo_k$$

wherein, only the following contributors are considered:

1. Vertical error $\varphi$ directly expressed in the local geographic reference frame [g];
2. Stationary harmonisation error in the reference frame of the tracker [k] $Harmo_k$ and that it must be projected into the local geographic reference frame [g] via
   a. $T_{ba}$ known stationary matrix,
   b. $\hat{T}_{ak}$ harmonisation matrix,
   c. $\hat{T}_{gb}$ attitude matrix (Heading, Sway, Pitch)

Thus, by making the heading vary from 0° to 360°, the polar coordinate position error obeys a circle-type law, the centre of which is the vertical error and the harmonisation error radius.

Figure 4:
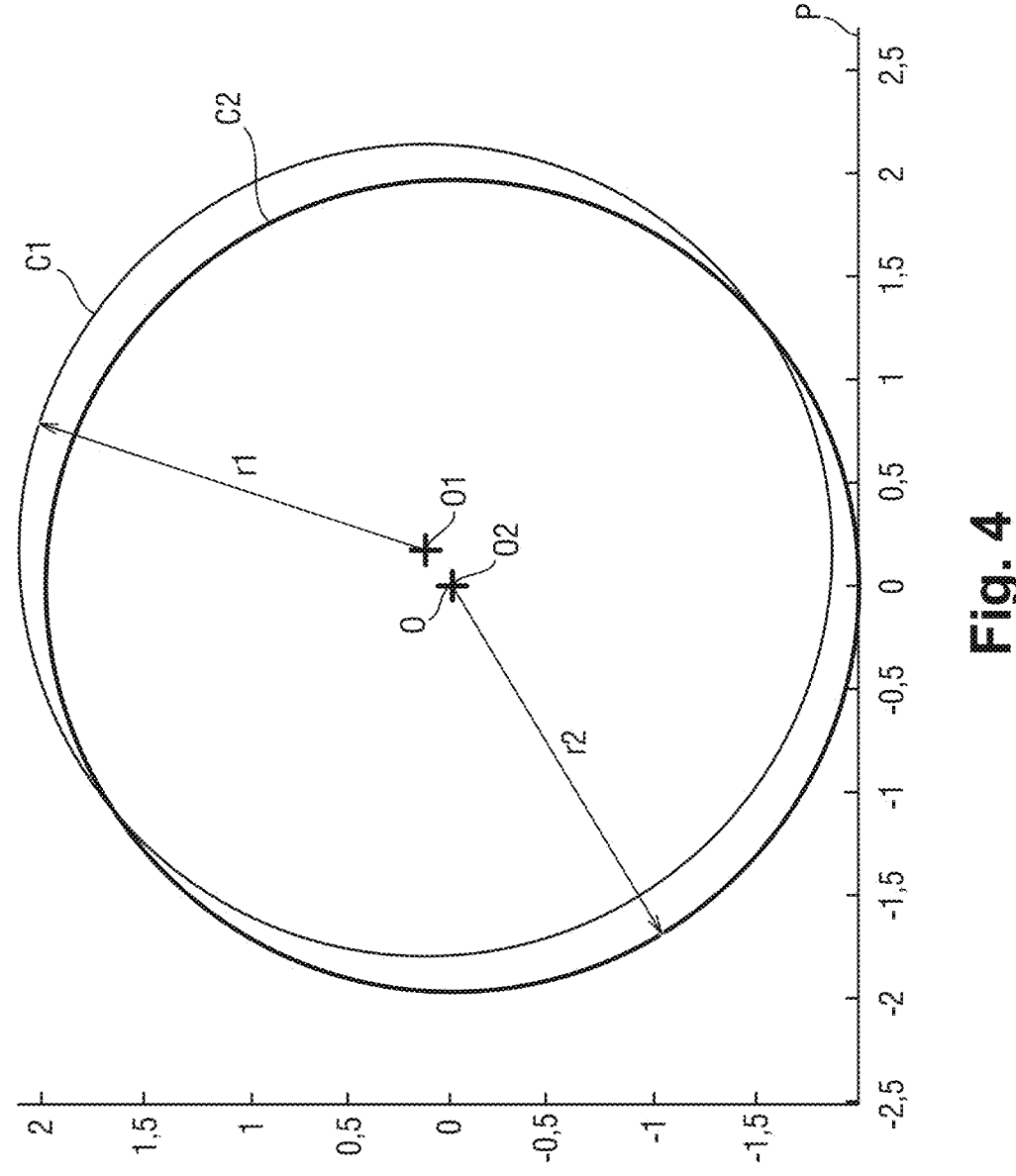
FIG. 4 is a schematic depiction of an indicator obtained by the implementation of the method of the invention, revealing a correct performance of the star tracker.
Figure 5:
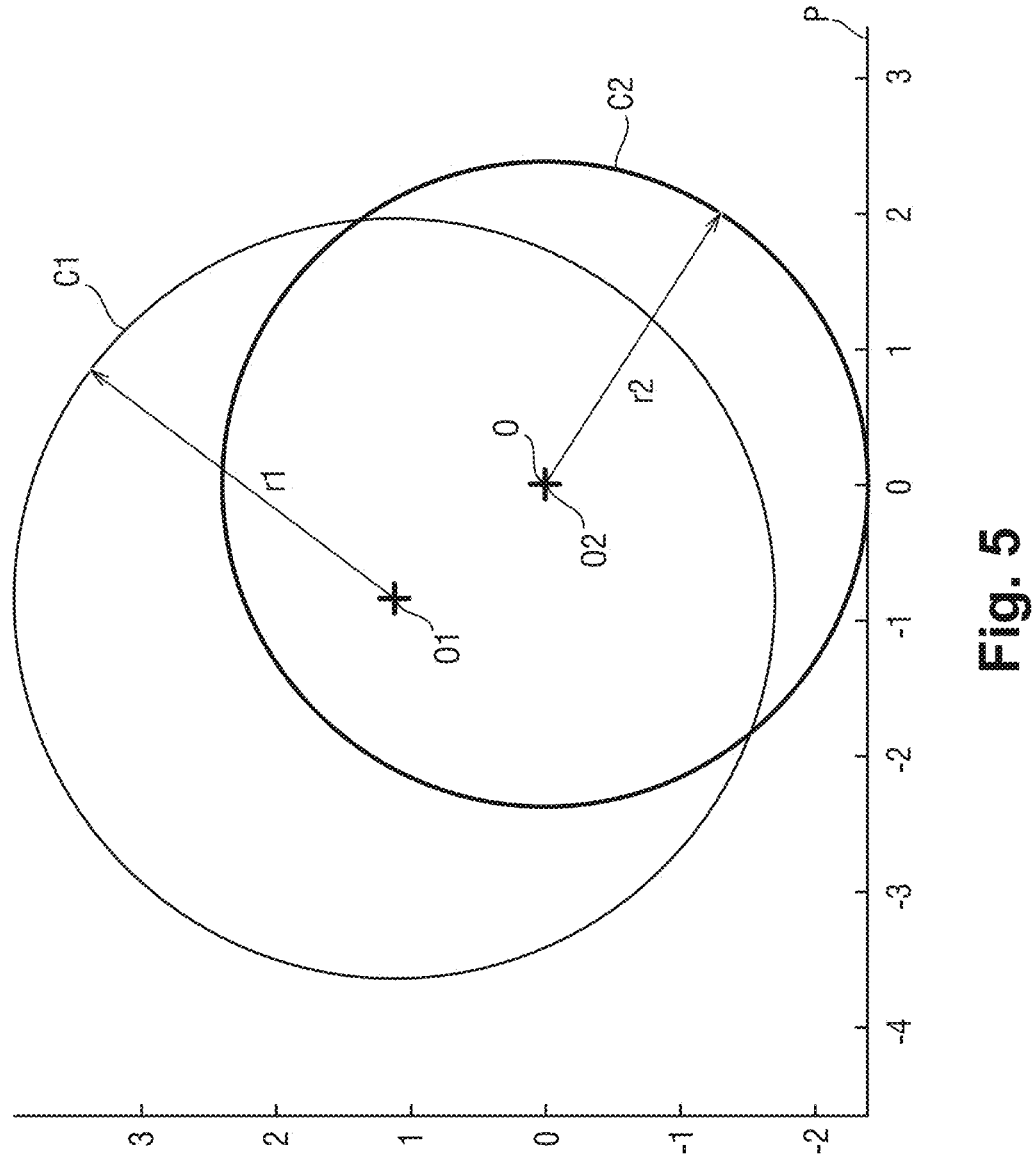
FIG. 5 is a schematic depiction of this same indicator obtained by the implementation of the method of the invention, revealing a degraded performance of the star tracker.

It is possible to present to the pilot of the aeroplane, a depiction of the two circles C1, C2 in the reference frame P like on FIGS. 4 and 5.

Preferably, the method comprises the step of determining an indicator representative of the coherence between the first circle C1 and the second circle C2. As an example, this indicator is a percentage representative of the coverage ratio of the circle C2 by the circle C1. The indicator can also be an indication of a sufficient (or not) coherence (by comparing the coverage ratio to a threshold beyond which it is considered that the coherence is sufficient). It is preferably the indicator which will be presented to the pilot of the aeroplane A.

It is understood that in this preferred embodiment:

the inertial measurement device 320 forms a first inertial measurement device which is associated with the star tracking device and which provides first inertial measurements used to determine an orientation of the star tracking device, on which the stellar measurements depend;

the inertial measurement device 100 forms a second inertial measurement device which provides second inertial measurements which are used coupled with the satellite measurements to develop third positions by means of a third navigation algorithm.

A numerical example will now be described. The tracking device has been oriented according to five different tracking headings and 342 first deviations (Ymeasurement) between first positions and second positions have been calculated in total, namely:

| Headings | 10° | 60° | 85° | 188° | 270° |
|---|---|---|---|---|---|
| Number of Ymeasurement values | 50 | 100 | 45 | 122 | 25 |
| Number of values for the circular regression | 1 average of the 50 values | 1 average of the 100 values | 1 average of the 45 values | 1 average of the 122 values | 1 average of the 25 values |

It is understood that, during the circular regression carried out on the average of the Ymeasurement deviations per heading series, an equivalent weight is given to all the headings, while the number of values at the headings 10°, 85° and 270° is, in this case, as a minimum, twice less than the number of values of the headings 60° and 188°.

The linear regression will make it possible to detect if this imbalance affects the precision of the calculation of the errors by the circular regression.

To carry out the linear regression, 342 first Ymeasurement deviations are started with, and the value of each of these first deviations is calculated after a rotation opposite the heading to return the first deviations on a single heading and obtain third deviation Y values, that is $Y=Z(-heading)$ ·Ymeasurement.

By linear regression, a straight line is obtained, depicting all of the Y values, and the harmonisation error between the inertial measurement device 320 and the star trackers 330 of the star tracking device 3, and the attitude error of the horizontal plane of the inertial measurement device 320 are deduced from these. The radius r2 of the circle C2 is equal to the harmonisation error and the deviation between the centre c2 of the circle C2 and the origin o of the polar reference frame P is equal to the attitude error of the inertial measurement device 320.

If the circles C1 and C2 are not coherent, it is possible to redefine a circle C1 by deviating the values of one of the headings for which the number of values is low, so as to determine if the incoherence does not result from the weight which is too high, which has been given to this heading during the linear regression.

The regressions are calculated conventionally, for example by a Kalman filtering or the least-squares method.

It is noted that it is possible to make the plate 312 rotate to implement the method when the aeroplane A is obligated to fly for a long duration according to a single heading. Thus, these phases of monitoring the harmonisation error between the inertial measurement device 320 and the star trackers 330 of the star tracking device 3 and the attitude error of the inertial measurement device 320 are periodically proceeded with. However, when the aeroplane A undergoes heading changes, the method is implemented in real time by keeping the plate 312 fixed: the first deviations are calculated and placed in the polar reference frame P in real time. Thus, a phase of continuously monitoring the harmonisation error between the inertial measurement device 320 and the star trackers 330 of the star tracking device 3 and the attitude error of the inertial measurement device 320 is proceeded with.

Naturally, the invention is not limited to the embodiment described, but comprises any variant entering into the field of the invention such as defined by the claims.

In particular, the tracking system according to the invention can have a different structure from that described.

The electronic units can be separated from one another or, on the contrary, be grouped together in one or more electronic units. The algorithms can be distinct or several can form part of a single algorithm. Several computer programs implemented can be separate computer programs or form parts of a single computer program.

The star tracking device can have no rotary table. Thus, it advantageously comprises at least two trackers and preferably three trackers disposed at 120° from one another and fixed to the structure of the vehicle which thus forms a support. To obtain measurements according to different headings of the vehicle, corresponding movements of the vehicle must be controlled, and the measurements for the different headings must be carried out.

The number of inertial measurement units equipping the vehicle can be less or greater than two. The invention can, for example, be implemented with a vehicle comprising a single inertial measurement unit dedicated to both the inertial navigation and to the pointing of the optical tracking device. In this case, if the inertial measurement unit is moved away from the star tracking device, it must be provided to consider possible deformations of the structure of the vehicle between the star tracking device and the inertial measurement unit: a system for measuring deformation by mirror can be used for this purpose. It is also possible that the single inertial measurement device is that associated with the star tracking device. The deformations between the star tracking device and the centre of gravity, lift, or hull, according to the type of vehicle, must be considered.

The method can comprise one or more different steps. For example, the method cannot comprise the steps making it possible to define and trace the circle C2.

The term "vehicle" relates to any means of transport:

passengers, goods and/or other loads (sensors, explosives or other), etc., civil or military, piloted or not, such as aircraft (aeroplanes, helicopters, drones), ships (surface, even submarines navigating on the surface, drones), land vehicles (cars, lorries, motorcycles, drones, tanks, etc., with wheels or with tracks), projectiles (missiles, for example), etc.

The device can also be implemented to carry out a verification of the harmonisation of the two star tracking heads on the ground.

The invention claimed is:

1. A navigation method of a vehicle equipped with a star tracking device, a first inertial measurement device and a satellite positioning device, the star tracking device and the first inertial measurement device being rigidly connected to a single support, comprising the steps of:
   controlling movements of the support according to different tracking headings of the star tracking device, simultaneously with these movements, calculating in a horizontal plane, first positions of the vehicle on the basis of a first navigation algorithm using stellar measurements, and second positions of the vehicle on the basis of a second navigation algorithm using first inertial measurements coming from the first inertial measurement device coupled with satellite measurements, calculating first deviations between the first positions and the second positions corresponding to each tracking heading and depicting them in a polar reference frame as a function of the corresponding heading and values of the first deviations, carrying out a circular regression on said first deviations to determine, in this polar reference frame, a first circle representative of all of the first deviations, determining a radius of the first circle, this radius being representative of a harmonisation error between the inertial measurement device and the star tracking device, and a second deviation between a centre of the first circle and an origin of the polar reference frame, the second deviation being representative of an attitude error of the horizontal plane of the inertial measurement device, monitoring the harmonisation error and the attitude error of the horizontal plane.

2. The navigation method according to claim 1, wherein the first deviations are depicted in the polar reference frame in the form of an average of the values of the first deviations per heading.

3. The navigation method according to claim 1, comprising the steps of:
   returning all the first deviations to a single heading to obtain third deviations,
   carrying out a linear regression on the third deviations to obtain a straight line representative of all of the third deviations,
   deducing from this, an attitude error of the horizontal plane and a harmonisation error between the star tracking device and the inertial measurement device,
   defining in the polar reference frame, a second circle having a radius equal to the harmonisation error and a centre separated from an origin of the polar reference frame according to a vector corresponding to the attitude error of the horizontal plane as a function of the heading,
   verifying a coherence between the first circle and the second circle.

4. The navigation method according to claim 1, comprising the step of determining an indicator representative of the coherence between the first circle and the second circle.

5. The navigation method according to claim 1, wherein the first deviations are calculated and placed in the polar reference frame in real time.

6. The navigation method according to claim 1, wherein the heading movements of the support are obtained by controlling corresponding movements of the vehicle.

7. The method according to claim 1, wherein the heading movements of the support are obtained by making the support pivot with respect to the vehicle.

8. The navigation method according to claim 1, wherein:
   the first inertial measurement device is associated with the star tracking device and the first inertial measurements are used to determine an orientation of the star tracking device on which the stellar measurements depend;
   the vehicle comprises a second inertial measurement device providing second inertial measurements which are used coupled with the satellite measurements to develop third positions by means of a third navigation algorithm, the third positions being used to direct the vehicle.

9. The navigation method according to claim 1, implemented to carry out a verification of a harmonisation of the star tracking device, while the vehicle is immobile.

10. A navigation system for a vehicle, comprising a star tracking device, an inertial measurement device, a satellite positioning device, and an electronic navigation calculation unit connected to these, the star tracking device and the inertial measurement device being rigidly connected to a single support and the electronic navigation calculation unit being programmed to implement the navigation method according to claim 1.

11. A vehicle equipped with the navigation system according to claim 10.

\* \* \* \* \*